Feb. 7, 1961 E. J. DIEBOLD 2,971,130
ELECTRO-DYNAMIC SWITCHING DEVICE
Filed Jan. 10, 1956 2 Sheets-Sheet 1
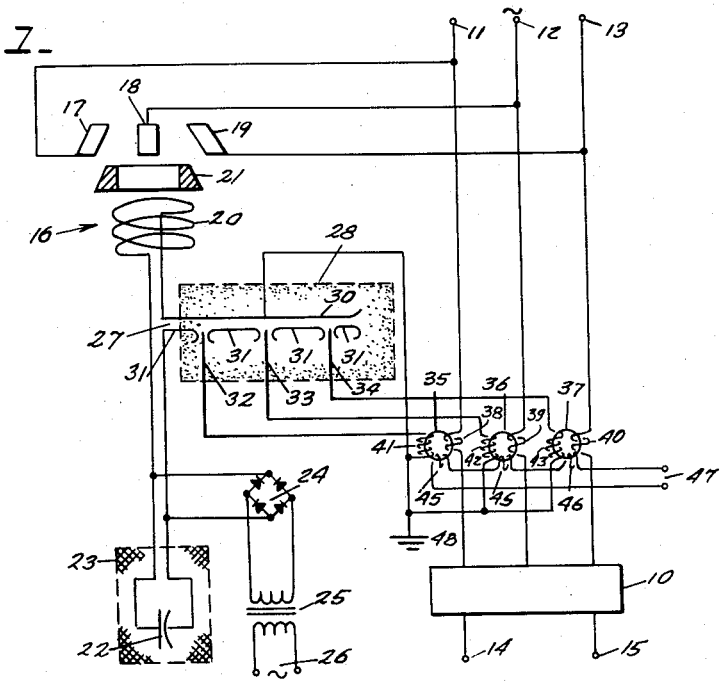
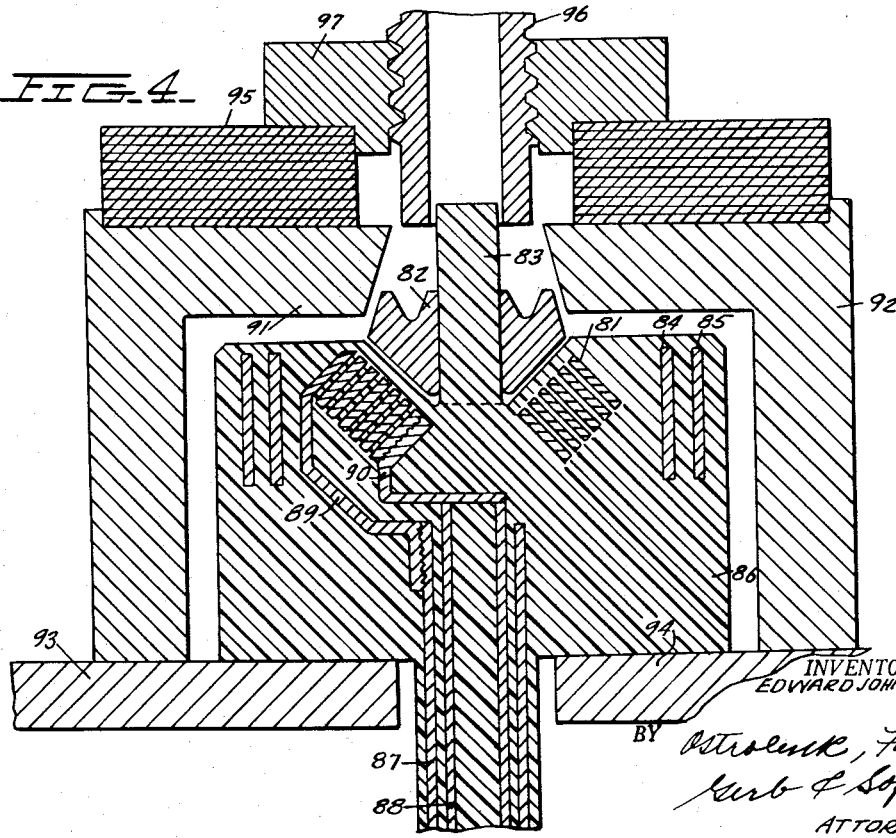
INVENTOR.
EDWARD JOHN DIEBOLD
BY
ATTORNEYS Feb. 7, 1961   E. J. DIEBOLD   2,971,130
ELECTRO-DYNAMIC SWITCHING DEVICE
Filed Jan. 10, 1956   2 Sheets-Sheet 2
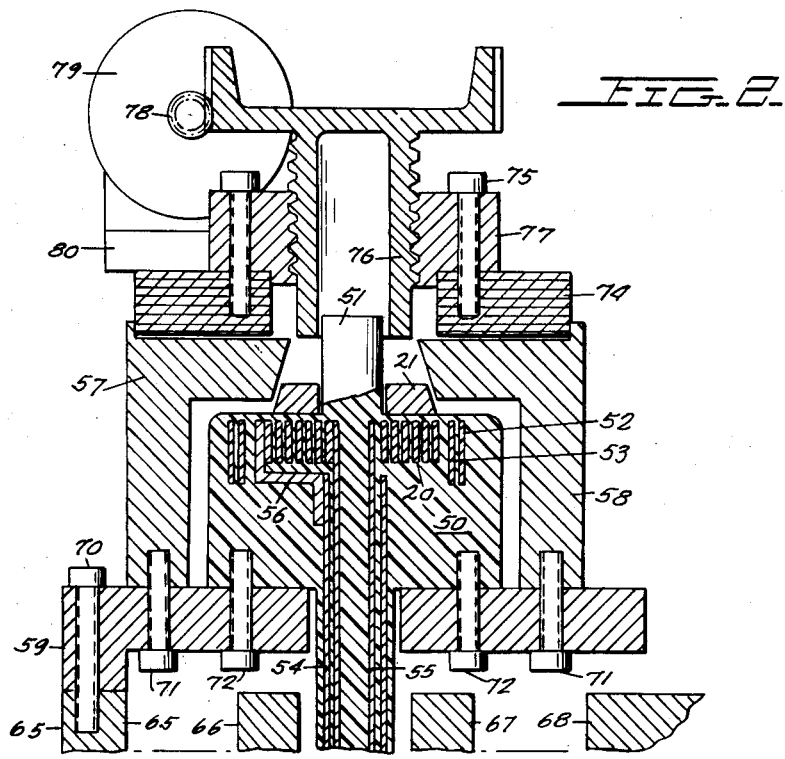
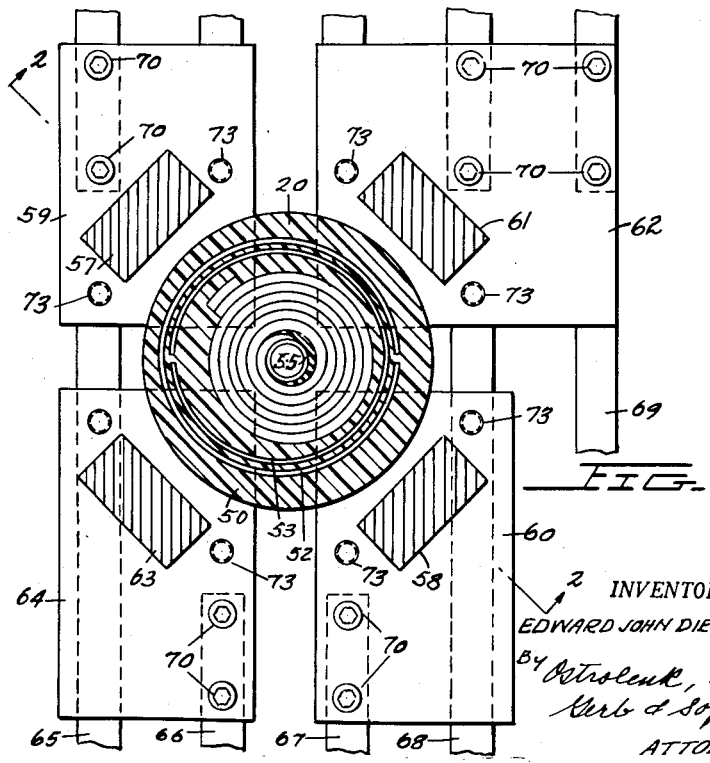
INVENTOR.
EDWARD JOHN DIEBOLD
BY Ostrolenk, Faber,
Gerb & Soffen
ATTORNEYS

United States Patent Office 2,971,130
Patented Feb. 7, 1961

2,971,130

ELECTRO-DYNAMIC SWITCHING DEVICE

Edward John Diebold, Ardmore, Pa., assignor to I-T-E Circuit Breaker Company, Philadelphia, Pa., a corporation of Pennsylvania Filed Jan. 10, 1956, Ser. No. 558,348

6 Claims. (Cl. 317—16)

My invention relates to contacting devices of the type shown in my copending application Serial No. 558,349 filed January 10, 1956 and is more specifically directed to the type of contacting device as applied to a short circuiting device.

In principle, there are two ways of protecting electrical equipment subject to short circuit conditions. The first is to connect a fuse or circuit breaker in series with the equipment. When this equipment is faulted, the current rises to a very high value which operates the series connected protecting device to open the circuit. By the action of the protecting device, the faulted equipment is disconnected from the circuit and thus the energy from the circuit is prevented from damaging the faulty equipment. Furthermore, the fault is prevented from draining too much energy from the system and thus endangering the operation of other equipment connected to the same system.

A second way of protecting electrical equipment is in the use of a so-called bypasser or short circuiter. In this type of protection, the protecting device is connected in parallel with the equipment to be protected. Hence, if a fault occurs on the piece of equipment being protected, the protecting equipment or so-called short circuiter closes almost instantly and prevents the fault current from flowing through the faulty piece of equipment by providing a very low resistance bypass. A very large fault current now flows through the short circuiting element itself until protective equipment which may be provided in series with the short circuiter operates and thus disconnects the power source.

The speed of operation of all protective equipment, whether of the series or parallel connected type is of primary importance. In the case of power converters, the short circuit capacity of the system supplying the power converter usually is very high and the converter, in case of an arc-back or backfire, is subjected to very large power which could destroy the equipment. Clearly, if the protective equipment can be made to act faster, the amount of energy dissipated within the converter is reduced, and thus the possibility of damage to the converter is reduced.

For similar reasons, transformers or generators, which are subject to internal faults should also be protected with exceedingly fast operating protective equipment. In the case of generators this can be done by exceedingly fast suppression of the field by strong bucking voltages, whereas in the case of transformers the same problem exists as in the case of power converters.

All presently used equipment for interrupting or closing circuits by mechanical means operate in accordance with two closely related general principles. The first is to actuate a spring which is connected to operate a switching device by the operation of a motor or a solenoid. The spring is maintained distorted by means of a latch to thereby store energy. Hence, when the latch is released by a tripping means, which can act relatively fast when the tripping coil releases the latch the spring opens (or closes) the switching device.

The second principle is to operate the switching device directly by means of a magnetic field generated within a coil and flowing within a ferromagnetic body which is connected to the switching device. This second principle achieves simplicity, but due to saturation effects, the force which can be imparted to the ferromagnetic body is relatively small. Hence, speed of operation of devices operating according to the above stated principles is relatively slow for application to short circuiting a faulted piece of electrical equipment.

The principle of my invention is to provide a contact device in which the only movable part is a ring-shaped electric conductor which is a movable contact and a short circuited winding. This ring-shaped electrical conductor may make contact between fixed electric conductors which engage the ring along the surface of a cone whereby a circuit is closed or opened between the surface of these fixed electric conductors and the surface of this ring. This unitary movable contact and short circuited winding is then positioned to be very close to an operating winding which may be a flat spiral-shaped coil whereby very good coupling is obtained between the two coils. The operating winding is then connected to be energizable by a very strong current of a very high frequency which may be supplied by a large capacitor.

Hence, upon energization of the operating winding, the magnetic field of the operating winding will induce a current in the short circuited movable contact which will in turn create its own magnetic field. These two fields will then interact to repel one another, whereby, a high force will be imparted to the movable conducter, which force will then serve to move the movable conducter into contact operation with its cooperating stationary contact. Hence, if the cooperating contacts are connected in parallel with a piece of electrical equipment, and the operating winding is energized responsive to a fault in this electrical equipment, then the faulted equipment will be short circuited in an extremely short time by a contacting device which will shunt out the fault current.

Short circuiters operating in accordance with the above stated principle have many advantages. First the force available between the two coils of the air-core transformer formed by the short circuited movable winding and the operating winding is not limited in magnitude by any material constant. Forces of this nature are very well known in transformers, their magnitude being independent of the state of magnetization of the transformer core, and depending only on the magnetic field between the two coils. If the primary coil or operating winding is subjected to a very high current of a very high frequency, it induces an extremely high current of the same frequency in the secondary coil which is in opposite direction to the primary current. Coils which are closely coupled induce currents of such a magnitude that the primary and secondary ampere turns are approximately equal. If the coils are of a substantial width across the face along which they touch, and are relatively closely spaced, then the coupling is very good. The repelling force between such coils is proportional to the square of the current flowing through them. Furthermore, since the force is needed for only a very short time, an exceedingly high current is permissible because before the current has time to heat the coil by any appreciable amount it is no longer needed and had decayed to zero. Therefore, the only physical limitation which limits the attainable velocity of this novel system is the strength of the components.

Accordingly, a primary object of my invention is to provide a contacting device which operates to short circuit a faulted piece of electrical equipment.

Another object of my invention is to provide a short circuiter in which the movable contact member is constructed to form a short circuited winding which is disposed to cooperate with an energizable operating winding.

Another object of my invention is to provide a short circuiter having a movable contact, a stationary contact and an operating winding wherein the movable contact forms a winding which is repelled by the operating winding responsive to energization thereof, the repelling force moving the movable contact into contact engagement with the stationary contact.

Still another object of my invention is to provide a short circuiter wherein a relatively movable contact ring is moved responsive to the discharge of a capacitor through an operating winding which is closely coupled to the movable contact ring.

These and other objects of my invention will become apparent when taken in connection with the drawings in which;

Figure 1 schematically illustrates an embodiment of my novel invention as applied to the protecting of a rectifying device.

Figure 2 shows a sectional view of one embodiment of a short circuiter that may be applied in the manner shown in Figure 1.

Figure 3 shows a top sectional view of Figure 2 wherein Figure 2 is taken along the diagonal lines 2—2.

Figure 4 shows a sectional view of a second embodiment of a short circuiter which may be applied to the application of Figure 1.

Figure 1 schematically shows a short circuiting device which is connected to protect a power converter. More specifically, Figure 1 shows a rectifier 10 which converts three phase alternating current from the A.C. terminals 11, 12 and 13 into direct current at the D.C. terminals 14 and 15. The short circuiter seen generally at 16 comprises the fixed contacts 17, 18 and 19, an operating coil 20 and the movable contact ring 21. A capacitor 22 which is filled with an insulating medium 23 is maintained charged by a semi-conductor rectifier 24 which is energized from transformer 25 which is connected to A.C. source 26.

Capacitor 22 is connectable to the operating winding 20 by spark gap 27. Spark gap 27 is situated in the enclosure 28 which is filled with radioactive ionized gas.

The spark gap in enclosure 28 more specifically comprises plates 30 and 31 and the firing electrodes 32, 33 and 34. The firing electrodes 32, 33 and 34 are energized by impulse transformers 35, 36 and 37 which have main windings 38, 39 and 40 respectively, impulse windings 41, 42, 43, respectively and bias windings 44, 45 and 46 respectively. The bias circuit is then energized by a D.C. source 47, and one end of the impulse windings 41, 42 or 43. By way of example, if a fault to ground 48.

The operation of the impulse transformers which fire the spark gap 27 to energize the protective circuit is described in my copending application Serial No. 641,301 filed February 20, 1957. To summarize this operation it must first be understood that currents flowing into the converter 10 from the terminals 11, 12 and 13 are direct current pulses, each of which last for one-third of a cycle. The bias windings 44, 45 and 46 are supplied with direct current from the source 47 in such a way that the direct current magnetization of the bias adds to the direct current magnetization provided by the main windings 38, 39 and 40. Under normal conditions, by the common action of the bias windings 45, 46 and 47 and the main windings 38, 39 and 40 the cores of the impulse coils 35, 36 and 37 are always fully saturated in a positive direction.

However, in the case of a back-fire or other fault a reverse current develops in one of the windings 38, 39 or 40 and this reverse current will very rapidly reach the small amount provided by the bias coils 44, 45, and 46. When the two currents are equal and opposite, the core of the impulse coil unsaturates. Hence, the flux of the core changes very rapidly and a very high voltage impulse is induced in the corresponding impulse windings 41, 42 or 43. By way of example, if a fault occurs in phase 11, the high voltage generated in the winding 41 appears between the electrode 32 and the electrode 30. The voltage appearing between electrode 32 and electrode 30 creates a spark between them which appears instantaneously because the atmosphere shown as dots within the box 28 is kept ionized by means of a radioactive substance such as tritium.

When the spark gap fires between electrodes 32 and 30, the spark immediately develops into an arc between the electrodes 30 and 31 because of the high voltage appearing between the two plates, supplied by the rectifier 24 which also keeps the capacitor 22 charged. As soon as an arc is initiated between electrodes 30 and 31, the capacitor 22 discharges itself into the short circuit which is afforded by its leads and the coil 20.

The lead inductance, the spark gap inductance and the leakage reactance of the coil 20 is kept very low to permit an exceedingly high peak current to flow with a very high oscillating frequency. This highly oscillating current of the high magnitude in coil 20 induces a similarly high current in the ring 21 which then is repelled with a very strong force.

The ring 21 travels upwards and its cone-shaped outer surface hits the electrodes 17, 18 and 19 which have inside surfaces matching the outer surface of ring 21. This ring, then, jams itself between these three electrodes and therefore causes a very low resistance short circuit between the three electrodes 17, 18 and 19, thus short circuiting the lines 11, 12 and 13 and protecting converter 10 against the flow of fault current. Circuit breakers behind the terminals 11, 12, and 13 may subsequently act to open the shorted lines 11, 12 and 13.

Figures 2 and 3 show a first embodiment of my novel short circuiter which could be used in Figure 1 and short circuits four conducting members. The drive coil 20 is wound in a spiral form and as seen in Figure 2 is connected to the lead tubings or coaxial conductor 54 and 55. A connecting strap 56 is provided to connect lead 54 to one end of coil 20.

Coil 20 is surrounded by two stainless steel straps 52 and 53 which form two slotted rings. These slots are needed to prevent the flow of short circuit current in these straps.

The straps 52 and 53 may be made from stainless steel such as the AISI spec. type 302, cold-rolled spring tempered stainless steel which has a conductivity of 2.5 percent of standard copper and a yield strength of 175,000 pounds per square inch. This material is practically non-magnetic because it has a permeability of 2.7 and has a field strength of 200 oersteds. Straps 52 and 53 form retainer rings which are cast together with the coil 20 into a casting resin 50. This casting resin might be an epoxy resin such as Araldite and the casting resin 50 may, if desired, be filled with a filler such as chopped glass fiber.

Fiber glass resin potted piece 50 is provided with an extension 51, around which is situated the movable contact piece 21 and extension cylinder 51 serves as a guide to the movable ring 21. The rings 52 and 53 which are potted into member 50 are needed to prevent it from exploding under the forces set up by the high current flowing in the coil 20.

The movable ring 21 is movable into engagement with conductors 57, 58, 61 and 63 of Figures 2 and 3 which are constructed to have a cone mating with the outer surface of piece 21. These fixed conducters or contacts 57, 58, 61 and 63 are bolted to the connecting pieces 59, 60, 62 and 64 which may be bolted to bus bars 65, 67, 68 and 69, respectively.

More specifically, Figures 2 and 3 show the fixed contacts and the connectors being bolted together by bolts such as 71 and bolts 70 are used to bolt the connector 50 to the bus bar 65, and the connector 60 to the bus bar 67, the connector 62 to the bus bars 68 and 69 and the connector 64 to the bus bar 65.

Potted resin piece 50 is then bolted to the connectors 59, 60, 62 and 64 by means of the bolts 72. The bolts 73 shown in Figure 3 connect these connectors to the insulating piece 74 which supports the resetting mechanism for the bypasser.

A circular insulating plate 74 is provided and has a steel inset 77 bolted thereto by means of the bolts 75. The steel insert 77 has an inside thread within which lodges the piece 76 consisting of a very heavy screw and a gear. This piece 76 serves to reset the piece 21 once it has jammed itself between the contact pieces 57, 58, 61 and 63 after energization of the coil 20.

The resetting may be accomplished by means of the worm gear 78 fastened to the motor 79 which is fixed to the spacer 80.

Clearly the embodiments of Figures 2 and 3 are but one method of carrying out my novel principles and bypassers with two, three, five or more contacts which could be reset either by compressed air, oil under pressure, or a heavy solenoid are now evident.

Figure 4 shows a second embodiment of my novel invention wherein the drive coil 81 which has the shape of a truncated cone. It drives a contact ring 82 which is located inside and above the drive coil as in the embodiment of Figure 2. The ring 82 glides freely on the cylinder 83 which is part of the molded part 86. This molding also contains the stainless steel rings 84 and 85 which serve to contain the coil 81 which is connected to the two coaxial conductors 87 and 88 by means of the straps 89 and 90. The molded block 86 rests upon the connectors 93 and 94 which, in turn, bear the fixed contact 91 and 92. Upon these fixed contacts rests the insulating ring 95 which bears the threaded steel ring 97 containing the resetting screw 96.

The embodiment shown in Figure 4 operates the same way as that of Figures 3 and 2, such that when a capacitor, which is not shown, discharges itself through a switching means such as an ionized spark gap (not shown) and applies a high voltage between the coaxial conductors 87 and 88, a strong current flows, from the conductor 88 through the strap 90 and the coil 81 back to the strap 89 into the outer conductor 87 and to the capacitor. The molding 86 surrounds all of the parts under voltage stress and therefore provides a good insulation against flashover. The high frequency alternating current induces an exceedingly high alternating current in the ring 82. The repelling action between the two opposing currents in the coil 81 and 82 will drive the ring 82 upwards sliding on the cylinder 83 until it engages the fixed contacts 91 and 92 which it very effectively short circuits, and between which it jams itself due to the action of the cone on the outer surface of the ring 82 and the inner surface of the contacts 91 and 92. When the action of the bypasser or short circuiter is over, the apparatus can be reset to the initial position by the action of the screw 96 threaded into the nut 97 which is bolted to the insulating piece 95.

In order to increase the efficiency of the system, it is, as described in copending application Serial No. 558,349 filed January 10, 1956, to provide a ferrite member to couple to two coils of the system. In the case of Figure 2, this may be done by making post 51 of a ferrite to thereby achieve close coupling between coils 20 and 21.

Simarly, the post 83 of Figure 4 could be made of a ferrite.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A short circuiter for short circuiting electrical equipment responsive to predetermined conditions; said short circuiter comprising a fixed contact and a coaxial movable contact; said coaxial movable contact being axially movable into contact engagement with said fixed contact; said coaxial movable contact being constructed to form a short circuited ring; the axial length of said ring being relatively small in comparison to the diameter of said ring; an operating winding and energizing means therefore; one of the annular shaped surfaces formed by one end of said ring being positioned adjacent one of the annular shaped surfaces formed by one end of said operating winding to induce a current in said contact ring responsive to energization of said operating winding to thereby have said movable contact ring axially move into contact engagement with said short circuiter; said energizing means being operative responsive to said predetermined condition.

2. A short circuiter for short circuiting electrical equipment responsive to predetermined conditions; said short circuiter comprising a fixed contact and a coaxial movable contact; said coaxial movable contact being axially movable into contact engagement with said fixed contact; said coaxial movable contact being constructed to form a short circuited ring; the axial length of said ring being relatively small in comparison to the diameter of said ring; an operating winding and energizing means therefore; one of the annular shaped surfaces formed by one end of said ring being positioned adjacent one of the annular shaped surfaces formed by one end of said operating winding to induce a current in said contact ring responsive to energization of said operating winding to thereby have said movable contact ring axially move into contact engagement with said short circuiter; said energizing means comprising a capacitor, a means to maintain said capacitor charged and a switching means to connect said capacitor to said operating winding responsive to a predetermined condition; a guide means; said short circuited ring having said guide means extending therethrough in an axial direction to thereby guide the motion of said movable contact.

3. A short circuiter comprising a first and second stationary contact and a movable contact; said movable contact being constructed to move into bridging contact engagement with said first and second stationary contacts; said movable contact being constructed to form a short circuited winding; the axial length of said short circuited winding being relatively small compared to the diameter of said short circuited winding; an operating winding and energizing means therefore; one of the annular shaped surfaces formed by one end of said short circuited winding being positioned adjacent one of the annular shaped surfaces formed by one end of said operating winding to induce current in said movable contact responsive to energization of said operating winding to thereby bring about forces to move said movable contact into bridging contact engagement with said first and second stationary contacts; a guide means; said guide means being constructed to guide said movable contact in its motion to said contact engaged position.

4. A short circuiter for short circuiting electrical equipment responsive to predetermined conditions; said short circuiter comprising a fixed contact and a coaxial movable contact; said coaxial movable contact being axially movable into contact engagement with said fixed contact; said coaxial movable contact being constructed to form a short circuited ring; the axial length of said ring being relatively small in comparison to the diameter of said ring; an operating winding and energizing means therefore; one of the annular shaped surfaces formed by one end of said ring being positioned adjacent one of the annular shaped surfaces formed by one end of said operating winding to induce a current in said contact ring responsive to energization of said operating winding to thereby have said movable contact ring axially move into contact engagement with said short circuiter; said energizing means being operative responsive to said predetermined condition; said operating winding being a spiral wound coil embedded in an insulating housing.

5. A short circuiting device comprising a first and second cooperable contact constructed to be movable into engagement with one another; said first cooperable contact being constructed to form a short circuited winding; the axial length of said short circuited winding being relatively small compared to the diameter of said short circuited winding; an operating winding and energizing means therefore; one of the annular shaped surfaces formed by one end of said short circuited winding being positioned adjacent one of the annular shaped surfaces formed by one end of said operating winding to induce current in said short circuited winding upon energization of said operating winding to thereby bring about forces to move said first cooperable contact into contact engagement with said second cooperable contact; a resetting means; said resetting means being constructed to move said cooperable contacts to their disengaged position after movement to said engaged position.

6. A short circuiter for short circuiting electrical equipment responsive to predetermined conditions; said short circuiter comprising a fixed contact and a coaxial movable contact; said coaxial movable contact being axially movable into contact engagement with said fixed contact; said coaxial movable contact being constructed to form a short circuited ring; the axial length of said ring being relatively small in comparison to the diameter of said ring; an operating winding and energizing means therefore; one of the annular shaped surfaces formed by one end of said ring being positioned adjacent one of the annular shaped surfaces formed by one end of said operating winding to induce a current in said contact ring responsive to energization of said operating winding to thereby have said movable contact ring axially move into contact engagement with said short circuiter; said energizing means being operative responsive to said predetermined condition; said operating winding being a spiral wound coil embedded in an insulating housing; a resetting means; said resetting means being constructed to move said movable contact to a disengaged position with respect to said fixed contact after said movable contact has been moved to said contact engaged position.

References Cited in the file of this patent

UNITED STATES PATENTS

| | | |
|---|---|---|
| 363,186 | Thomson | May 17, 1887 |
| 370,573 | Thomson | Sept. 27, 1887 |
| 1,208,499 | Creighton | Dec. 12, 1916 |
| 1,230,681 | Creighton | June 19, 1917 |
| 1,560,803 | Miller | Nov. 10, 1925 |
| 1,711,285 | Petersen | Apr. 30, 1929 |
| 1,810,306 | Trofimov | June 16, 1931 |
| 1,980,736 | Trofimov | Nov. 13, 1934 |
| 1,996,606 | Ayers | Apr. 2, 1935 |
| 2,053,445 | Rose | Sept. 8, 1936 |
| 2,127,887 | Rayburn | Aug. 23, 1938 |

FOREIGN PATENTS

| | | |
|---|---|---|
| 381,045 | Germany | Sept. 15, 1923 |